Patented Oct. 16, 1923.

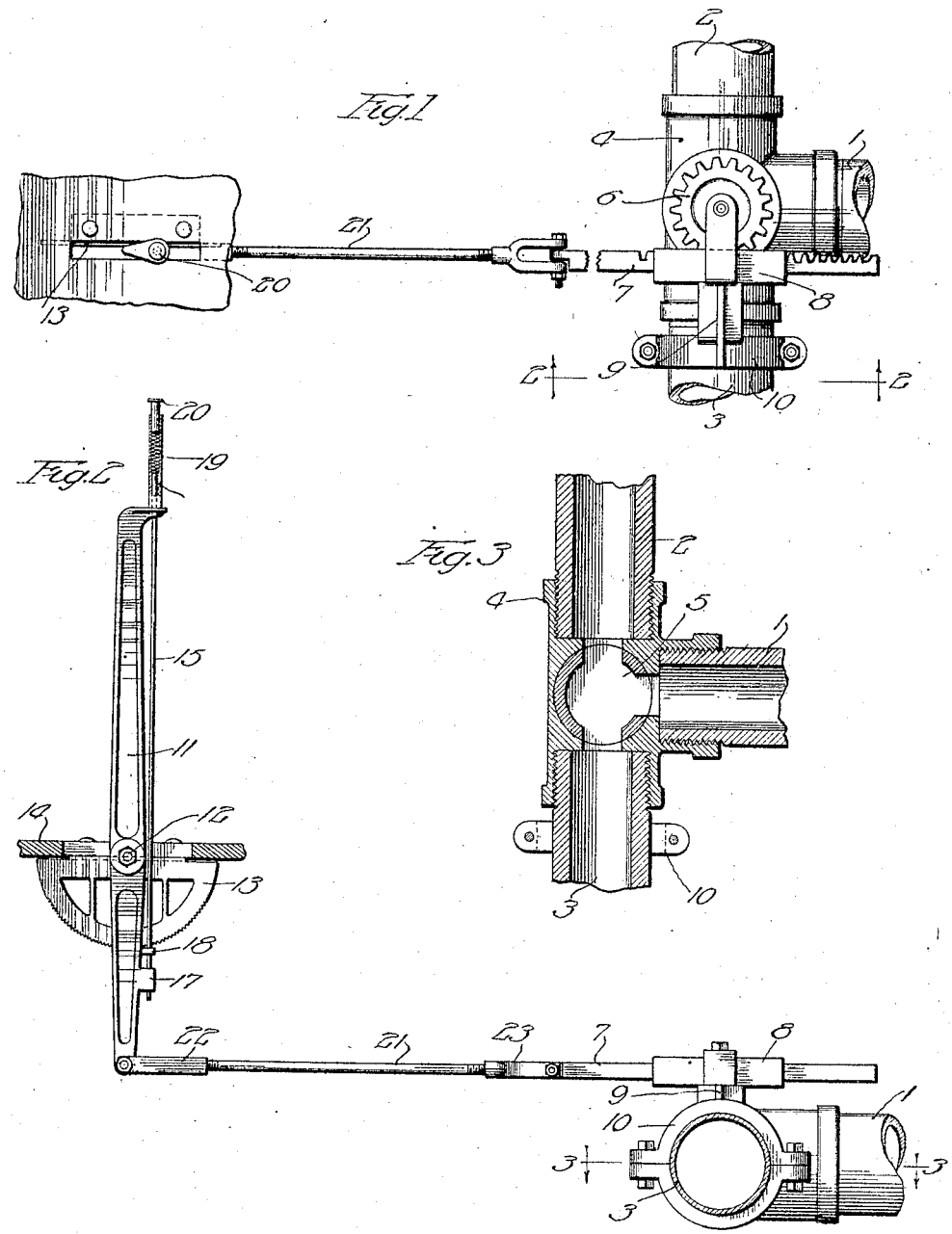

1,470,699

UNITED STATES PATENT OFFICE.

HALFTEN EUGENE OLSEN, OF CHICAGO, ILLINOIS, ASSIGNOR, BY MESNE ASSIGNMENTS, TO F. C. AUSTIN MACHINERY COMPANY, A CORPORATION OF ILLINOIS.

CONTROLLER FOR STREET SPRINKLERS OR FLUSHERS.

Application filed August 12, 1918. Serial No. 249,439.

*To all whom it may concern:*

Be it known that I, HALFTEN EUGENE OLSEN, a citizen of the United States of America, and resident of Chicago, Illinois, have invented a certain new and useful Improvement in Controllers for Street Sprinklers or Flushers, of which the following is a specification.

This invention relates to street sprinklers or flushers of that kind in which nozzles are provided at opposite sides of the vehicle to discharge laterally in opposite directions, and in which means are provided for controlling this discharge of water, or other liquid, depending upon the particular use to be made of the machine or vehicle.

Generally stated, the object of the invention is to provide novel and improved means for controlling the discharge, so that the discharge of the water may be governed or regulated in a more satisfactory manner than heretofore.

More specifically considered, the object of the invention is to provide a single valve mechanism which is controlled by a single hand lever in such a manner that the water can be discharged at either side of the vehicle, at will, or at both sides, merely by adjustment of said single hand lever to different positions.

It is also an object to provide certain details and features of construction tending to increase the general efficiency and desirability of a street sprinkler or flusher controlling apparatus of this particular character.

To these and other useful ends the invention consists in matters hereinafter set forth and claimed, and shown in the accompanying drawings, in which—

Fig. 1 is a plan of a controller embodying the principles of the invention.

Fig. 2 is a side elevation of said controlling apparatus.

Fig. 3 is a sectional view of the valve constituting a part of the controller.

As thus illustrated, the invention comprises a main water pipe 1 which leads from the tank, and branch pipes 2 and 3 which lead to opposite sides of the vehicle, thereby to supply water to the nozzles (not shown) which are ordinarily located at the sides of the vehicle, and which may be of any suitable, known or approved character. The three pipes are connected together by a T-coupling 4, and in this T-coupling there is a three-way valve 5 which can be turned in one position to supply water to both of the pipes 2 and 3, and which can be adjusted to other positions to cut off the water from either side of the vehicle, so that the discharge will take place at one side only. Also, as shown, this valve can be adjusted to a position to supply water to both sides of the vehicle, or it can be rotated to its normal position to entirely cut off the water, so that no discharge will take place at either side. This valve has a pinion 6 which engages a reciprocating rack 7 suitably mounted in the guide 8 held above the T-coupling by a bracket 9 secured in place on the pipe 3 by a collar 10 of any suitable character. A single hand lever 11 is pivoted on the vehicle at 12 in any suitable or desired manner, so that the lever will swing in a vertical plane, and a segment 13 is secured to the bottom of the wall or foot-board 14 of the vehicle. A vertically reciprocating rod 15 is mounted in upper and lower bearings 16 and 17 on said hand-lever, and provided with a dog 18 to engage the teeth of the segment 13, so that the lever can be locked in different positions. The handle 19 of the hand lever contains a spring to hold the rod 15 normally in raised position, and the upper end of the rod has a thumb-piece or button 20 by which to move it downward when it is desired to disengage the dog 18 from the curved rack or segment 13, in a manner that will be readily understood. A link or rod 21, which is adjustable to vary the length thereof, the ends of the rod being threaded in the forks 22 and 23, is provided for connecting the lower end of the hand lever 11 with the end of the rack 7, so that operation of the hand lever will rotate the valve.

With this construction, the entire discharge mechanism of the sprinkler or flusher is controlled by a single hand lever, and this hand lever can be adjusted to a position to rotate the valve into position to discharge water at both sides of the vehicle, or at one side alone, and the discharge at either side can be reduced or increased at will by slight adjustment of this hand lever. Normally, of course, the valve stands in position to close the pipes and to prevent any discharge of water from the nozzles. The pinion 6 is also carried by the bracket 9, and is adapted to removably engage the stem of the valve, so that the controller as a whole can be easily removed and replaced when such is necessary or desirable.

As shown and described, the recess in the valve 5, forming the passage therein for the water, serves to supply water to either nozzle or to both nozzles, from the single supply pipe 1 which leads to the valve mechanism. In this way only a single valve is employed, the two nozzles being controlled thereby, and the water from the supply pipe passing through the same valve passage regardless of whether either one or both of the nozzles are in operation.

What I claim as my invention is:—

1. In a street sprinkler or flusher, the combination of water pipes adapted to connect with nozzles at opposite sides of the sprinkler, a supply pipe, a coupling connecting said pipes, a rotary valve mechanism for which said coupling forms a casing, a controller comprising a pinion rigid with said valve mechanism, a rack engaging said pinion, a single hand lever for operation of said rack, a bracket connecting said controller parts as a unit, and devices for holding said lever in different positions, said valve mechanism having a movable member provided with a passage through which the water may be directed to either or both of said nozzles by manipulation of said hand lever.

2. A structure as specified in claim 1, said member being adjustable to one position to discharge the water at one side, or to another position to discharge the water at the other side, to a third position to discharge the water at both sides, and to a normal position to cut the water off from both sides.

3. A structure as specified in claim 1, said devices including a segment with teeth closed together, and means on said lever to engage said teeth, so that the discharge may be reduced or increased at either side.

4. A structure as specified in claim 1, in which said member has a pinion, a reciprocating rack to engage said pinion, and a rod to connect said rack with the lower end of said lever.

5. In a street sprinkler or flusher, the combination of a coupling, a rotary valve member in said coupling and adapted to be extended to nozzles at opposite sides of the sprinkler, a supply pipe leading to said coupling, discharge pipes leading from said coupling, a pinion rigid with said member, a reciprocating rack to engage said pinion, a guide for said rack, a hand lever connected to operate said rack, and means to hold said lever in different positions, said rotary valve member having four equidistant positions, and said reciprocating rack being long enough to permit rotation of said member into any position thereof by said hand lever.

6. A structure as specified in claim 5, in combination with means for detachably clamping said guide in position on the support formed by said pipes and coupling.

7. Controlling mechanism for street sprinklers or flushers, comprising a rotary valve member, a pinion rigid with said member, a reciprocating rack engaging said pinion, a guide for said rack, and means to operate said rack, said member having four equidistant positions, and said rack being long enough to rotate said member into any position thereof, and pipes extending from said valve member and adapted to be connected with the nozzles of the sprinkler.

8. Controlling mechanism for street sprinklers or flushers, comprising pipe connections, a valve to control the passages of said connections, mechanism to operate said valve, means to detachably clamp said mechanism in position on the support formed by said connections, and pipes extending from said valve and adapted to be connected with the nozzles of the sprinkler.

9. A structure as specified in claim 8, said mechanism comprising a rack and pinion, and said means including a separable collar on one of the connections.

Signed by me at Chicago, Illinois, this 23rd day of July 1918.

HALFTEN EUGENE OLSEN.